United States Patent
Smithson et al.

(10) Patent No.: US 11,384,636 B2
(45) Date of Patent: Jul. 12, 2022

(54) METHOD TO DETERMINE TRACER RESPONSE FROM NON-IDEAL CHEMICAL TRACERS

(71) Applicant: RESERVOIR METRICS IP HOLDINGS, LLC, Houston, TX (US)

(72) Inventors: Mitchell C. Smithson, Pasadena, TX (US); Alexander J. Darnley, Houston, TX (US); Wei Tian, Houston, TX (US); Christopher Dempsey, The Woodlands, TX (US); Brandon Hamilton, Houston, TX (US)

(73) Assignee: RESERVOIR METRICS IP HOLDINGS, LLC, Houston, TX (US)

( * ) Notice: Subject to any disclaimer, the term of this patent is extended or adjusted under 35 U.S.C. 154(b) by 271 days.

(21) Appl. No.: 16/653,277

(22) Filed: Oct. 15, 2019

(65) Prior Publication Data
US 2020/0123896 A1    Apr. 23, 2020

Related U.S. Application Data

(60) Provisional application No. 62/747,149, filed on Oct. 18, 2018.

(51) Int. Cl.
*E21B 47/11* (2012.01)
*G01F 1/704* (2006.01)

(52) U.S. Cl.
CPC .............. *E21B 47/11* (2020.05); *G01F 1/704* (2013.01)

(58) Field of Classification Search
CPC ..................................................... E21B 47/10
See application file for complete search history.

(56) References Cited

U.S. PATENT DOCUMENTS 4,055,399 A *  10/1977  Parrish ................... E21B 43/16
                                                                            436/27
5,047,632 A     9/1991   Hunt
                         (Continued)

FOREIGN PATENT DOCUMENTS

EP             0167233 A1      1/1986

OTHER PUBLICATIONS

International Organization for Standardization; "Measurement of Water Flow in Closed Conduits—Tracer Methods—Part II: Constant Rate Injection Method Using Non-Radioactive Tracers"; ISO 2975-2, dated Aug. 15, 1975, 12 pages.

*Primary Examiner* — Angela M DiTrani Leff
*Assistant Examiner* — Avi T Skaist
(74) *Attorney, Agent, or Firm* — Smith IP Services, P.C.

(57) ABSTRACT

A method for normalizing a chemical tracer response in a zone can include measuring a concentration of the tracer as produced from a proximal zone, measuring a concentration of a reference tracer as produced from the proximal zone, and applying a mathematical correction to a concentration of the tracer as produced from the zone. Another method can include normalizing a chemical tracer concentration to a reference tracer concentration, and then allocating flow to a zone corresponding to the tracer based on the normalized tracer concentration. Another method can include injecting a first chemical tracer into a first wellbore reference zone and into additional producing zones of the first wellbore, injecting a second chemical tracer into a second wellbore reference zone and into additional producing zones of the second wellbore, and injecting a third chemical tracer into each of the additional producing zones of the first and second wellbores.

20 Claims, 9 Drawing Sheets

(56) References Cited

U.S. PATENT DOCUMENTS

| | | | |
|---|---|---|---|
| 5,072,387 A | 12/1991 | Griston et al. | |
| 5,306,911 A | 4/1994 | Hunt | |
| 5,543,617 A | 8/1996 | Roscoe et al. | |
| 5,594,179 A | 1/1997 | Marsh | |
| 6,659,175 B2 | 12/2003 | Malone et al. | |
| 7,032,662 B2 | 4/2006 | Malone et al. | |
| 7,469,597 B2 | 12/2008 | Flaten et al. | |
| 2010/0032156 A1* | 2/2010 | Petty | E21B 43/26 166/252.1 |
| 2013/0087329 A1* | 4/2013 | Hewitt | C09K 8/68 166/250.12 |
| 2018/0080314 A1 | 3/2018 | Rule et al. | |

* cited by examiner

METHOD TO DETERMINE TRACER RESPONSE FROM NON-IDEAL CHEMICAL TRACERS

CROSS-REFERENCE TO RELATED APPLICATION

This application claims the benefit of the filing date of U.S. provisional application No. 62/747,149, filed 18 Oct. 2018. The entire disclosure of this prior application is incorporated by reference herein in its entirety for all purposes.

BACKGROUND

This disclosure relates generally to operations performed in conjunction with a subterranean well and, in an example described below, more particularly provides a method to determine tracer response from non-ideal chemical tracers.

It is common for a well to include multiple zones or stages from which well fluids (such as, liquid hydrocarbons, gas, water, etc.) are produced. It is beneficial to be able to determine the contribution of each zone or stage to overall production from the well. This is one example of a beneficial use of chemical tracers in a well.

It will, thus, be appreciated that improvements are continually needed in the art of utilizing chemical tracers in wells. Preferably, such improvements should provide for use of non-ideal chemical tracers.

DETAILED DESCRIPTION

Multistage horizontal well completions and hydraulic fracturing are widely practiced in unconventional reservoirs to explore and produce hydrocarbons from low permeability formations. Typically, each individual stage in a lateral is fractured by pumping a large volume of fracturing fluid with certain chemical additives and sand. Sand or other proppant is used to prevent fractures from closing during the depletion process, by propping open the fracture and thereby increasing an effective permeability of the formation.

Chemical tracer tests have been conducted to diagnose these types of fractures. Engineers inject chemical tracers (in solid, liquid or gaseous form), which do not occur in the reservoir naturally, into respective zones at a known concentration downhole. The tracers will flow back with hydrocarbon (oil or gas) and water, once the well is open for production after stimulation is completed. By collecting fluid samples and analyzing for tracer contents in the samples, engineers are able to characterize the fracture network in a subsurface reservoir.

One typical use of a chemical tracer test is to allocate stage inflow contribution, which is a ratio of each individual zone or stage's flow rate to a total production rate. It can be used for formation fluids such as water, oil or gas. This technique is based on the concept that flowback concentration of an ideal chemical tracer is directly proportional to the volumetric flow rate because dilution is the only mechanism which would cause tracer flowback concentration to be different from injection concentration.

An ideal chemical tracer can be defined as a conservative chemical compound soluble only in its carrier fluid. Thus, an ideal water tracer is soluble only in water, an ideal oil tracer is soluble only in oil, and an ideal gas tracer is soluble only in gas.

Ideal chemical tracers are also chemically and physically inert. As such, they should not partition between phases, adsorb onto rock grains, degrade due to high temperature and pressure, nor react with any compound in the formation fluids (such as water, oil, or gas).

When multiple ideal tracers are pumped into a same stage at a same concentration, their flowback profiles should be identical. The tracer flowback profile can be expressed as tracer concentration versus production time (in most cases), or cumulative production volume, when the well is producing.

However, field performance tests performed by the present inventors suggest that not all chemical tracers utilized to evaluate stage inflow contribution are ideal. In the tests, many oil tracers and water tracers currently in widespread use were injected into a heel stage of a lateral wellbore.

When the well started to produce after stimulation, oil and water samples were collected over time and analyzed using gas/liquid chromatography-mass spectrometry (GC/LC-MS). The analysis results showed that tracer concentration varied within each sample. Thus, these chemical tracers were shown to be non-ideal.

This observation raises the question of how chemical tracer concentration in well flowback can reliably be used to allocate stage inflow contribution for multistage well production. This specification discloses a method whereby non-ideal chemical tracers can be used to accurately determine the contribution of each stage to a well's commingled multistage production.

Careful examination of field performance test data reveals that tracer flowback profiles for multiple tracers are highly correlated. Importantly, one tracer's flowback profile can be normalized to match another tracer's flowback profile by multiplying the tracer flowback profile by a normalization coefficient.

In addition, this normalization coefficient for each tracer is consistent over proximal zones. Proximal zones can be defined as zones, in a same well or in different wells, but within the same field or formation, in which rock and fluid have substantially the same physical and chemical properties, with only minor insignificant differences. In the method examples described more fully below, proximal zones yield equivalent (within a suitable tolerance) normalization coefficients for a same injected tracer. Characteristics that might cause a zone to be "non-proximal" are a significant difference in rock characteristics (such as clay content, porosity, etc.) or well treatments (such as slick water composition, acid treatments, etc.).

Examples of the method are described below, but it should be clearly understood that these examples are only a few of a wide variety of different methods which can embody the principles of this disclosure. The method does not require that any zones or stages be hydraulically fractured or otherwise stimulated.

Figure 1A:
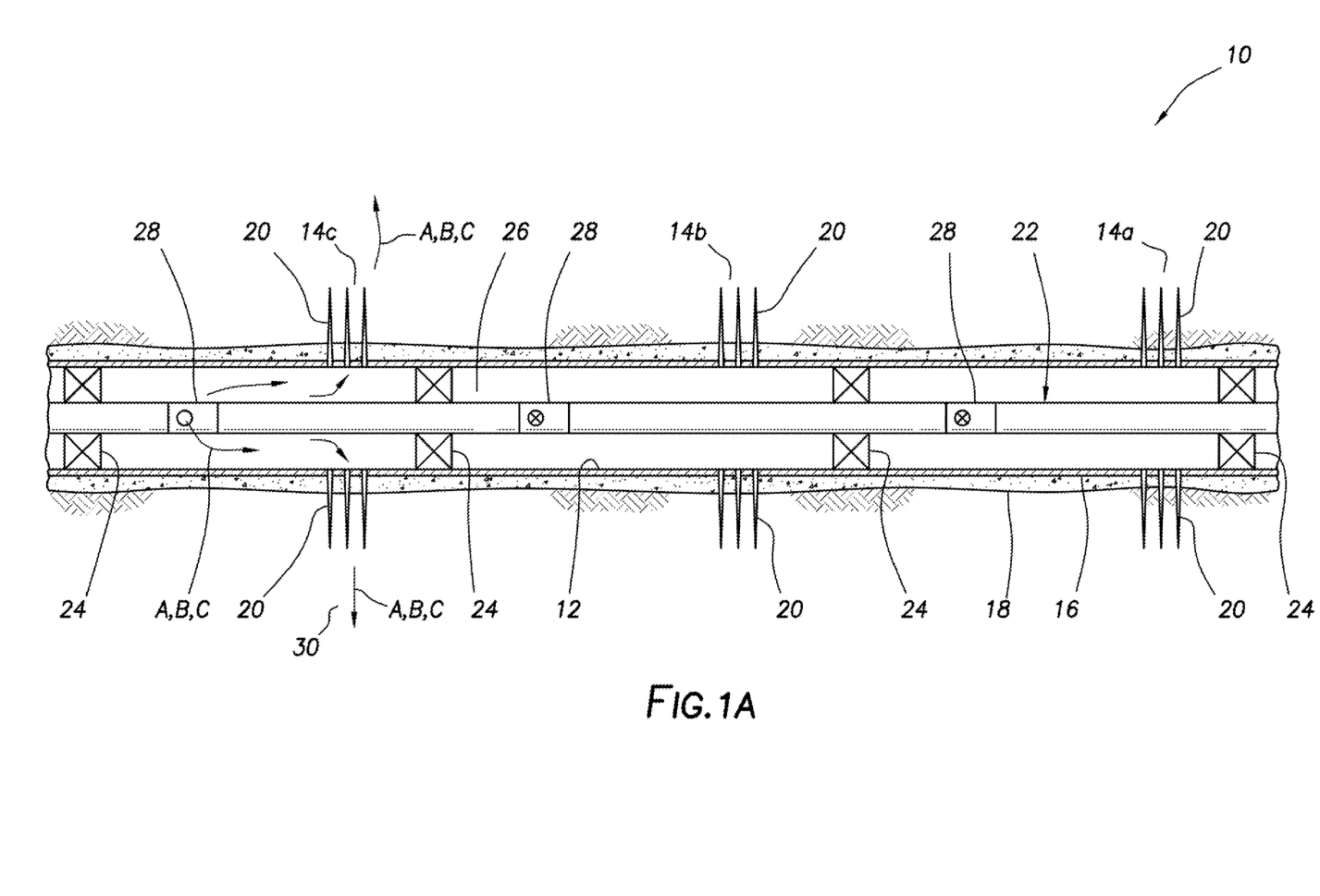
FIGS. 1A & B are representative partially cross-sectional views of an example of a well system and associated method which can embody principles of this disclosure.
Figure 1B:
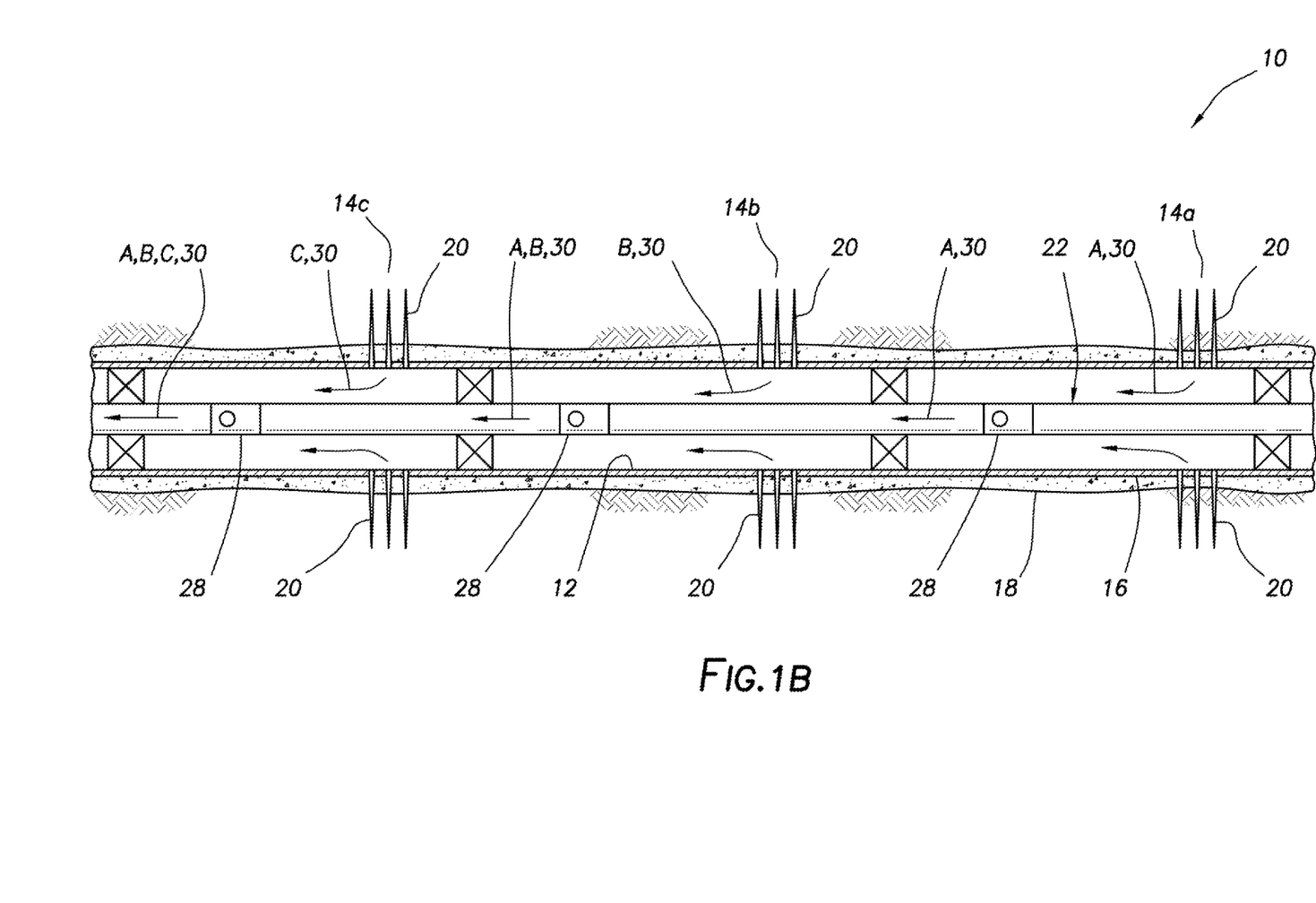

Representatively illustrated in FIGS. 1A & B is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

As depicted in FIG. 1A, a generally horizontal wellbore 12 has been drilled, so that it penetrates multiple formation zones 14a,b,c. The wellbore 12 is lined with casing 16 and cement 18. Perforations 20 through the casing 16 and cement 18 permit fluid communication between each of the zones 14a,b,c and an interior of the casing. In other examples, the wellbore 12 may not be horizontal (it could, for example, be generally vertical or deviated from vertical), the wellbore 12 may not be lined with cement or casing, and a different number or arrangement of zones could be penetrated by the wellbore 12.

A completion string, production tubing string or other tubular string 22 is positioned in the casing 16 proximate the zones 14a,b,c. In this example, the tubular string 22 includes packers 24 for isolating the zones 14a,b,c in an annulus 26 between the tubular string 22 and the casing 16.

The tubular string 22 also includes valves 28 for selectively permitting and preventing fluid communication between the annulus 26 and an interior of the tubular string at each zone 14a,b,c. Thus, in this example, each of the zones 14a,b,c comprises a single stage isolated between adjacent packers 24 in the wellbore 12, with one of the valves 28 controlling flow between the respective zone and an interior of the tubular string 22. However, a zone can in some examples include more than one stage.

In other examples, the tubular string 22 may not be used. The valves 24 could be connected in the casing 16, so that each of the valves controls flow between the interior of the casing and a respective one of the zones 14a,b,c. Thus, it will be appreciated that the scope of this disclosure is not limited to any particular number, combination or configuration of components such as valves, packers, tubular string, casings, etc., in the system 10.

In the method depicted in FIGS. 1A & B, the normalization coefficients for chemical tracers A, B, C can be determined via a field test comprising the following steps:

1. Pump all chemical tracers A, B, C at the same concentration into a single zone 14c. The chemical tracers A, B, C may be water tracers, oil tracers, gas tracers, or a combination of different types of chemical tracers, and may be solid, liquid or gas.

2. Collect fluid samples when the well is producing and analyze tracer A, B, C concentration in each sample.

3. Select one tracer (e.g., tracer A) as the standard or reference tracer, and find the normalization coefficient for each of the other tracers B, C to match their flowback profiles with the reference tracer A flowback profile.

As depicted in FIG. 1A, the tracers A, B, C are being injected into the zone 14c. The tracers A, B, C can then be produced from the zone 14c, along with formation fluids 30 (such as oil, water and/or gas) from the zone 14c (see FIG. 1B). This recovery of the tracers A, B, C from the zone 14c with formation fluids 30 may be referred to as "flowback," even though it may occur during normal production operations.

After retrieval of the tracers A, B, C with the formation fluids 30, each tracer's concentration in the formation fluids (e.g., in units of parts per million, parts per billion, or equivalent mass of the tracer per unit volume of the formation fluids) is detected or measured. A gas/liquid chromatography-mass spectrometer or other suitable instrument may be used for this purpose.

These measurements over time, or over produced volume, provide a tracer flowback profile. A representative example of a set of tracer flowback profiles is depicted in graph form in FIG. 1C.

Figure 1C:
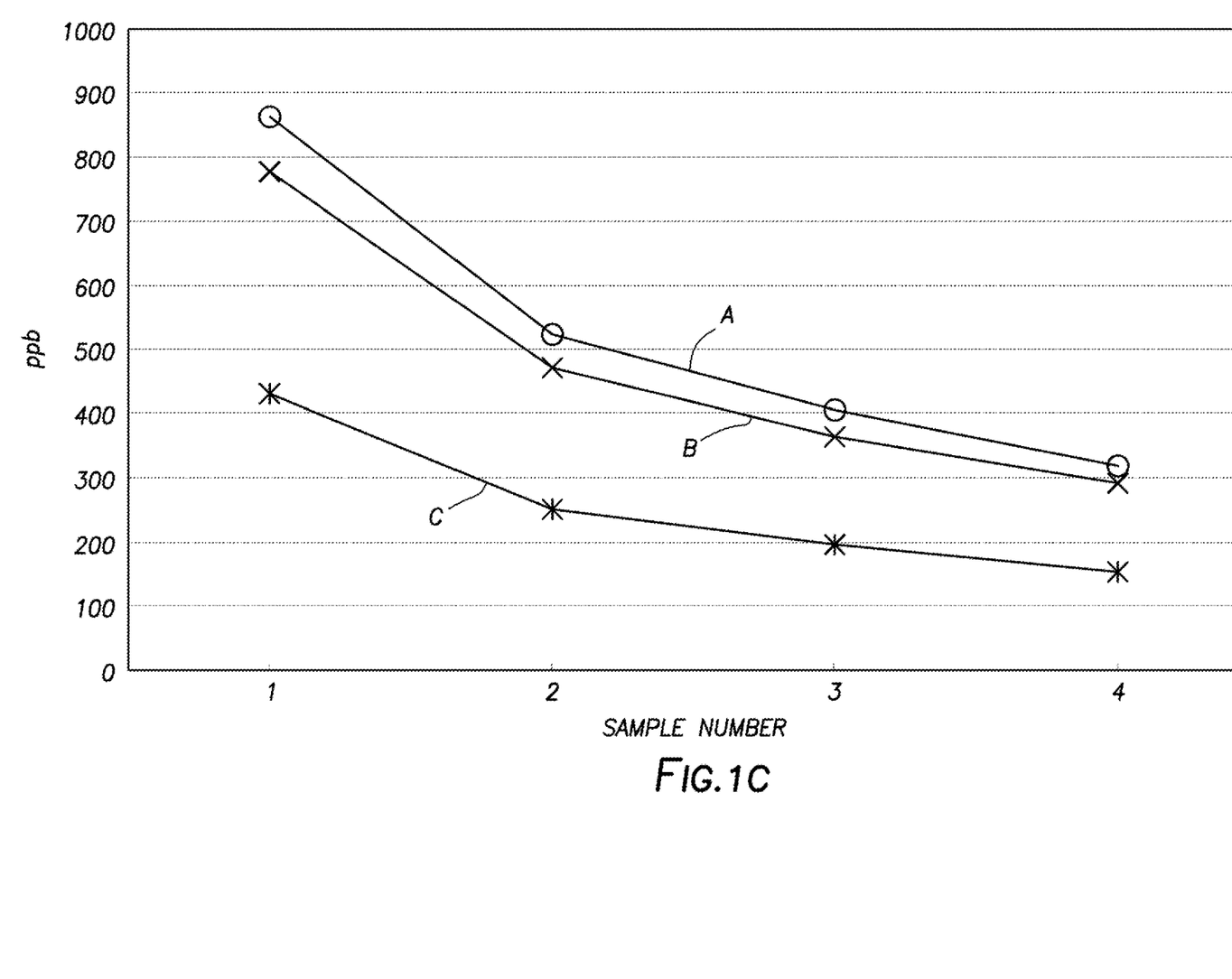
FIG. 1C is a representative graph of chemical tracer concentrations in fluids produced from the well for multiple samples over time in parts per billion.

Tracer concentration units in the FIG. 1C graph are parts per billion for each of four separate samples taken at known times or accumulated production volumes. Note that, although the flowback profiles for the tracers A, B, C are not the same, they are highly correlated. Standard regression analysis (such as, linear regression with a zero y-intercept) or other curve-fitting techniques may be used to determine a normalization coefficient that, when multiplied by the concentration of a given tracer (such as tracer B or C), will result in the equivalent concentration of a reference tracer (such as tracer A).

$$(C_B)(N_B) = C_A$$

The concentration $C_B$ of tracer B at a particular point during production, times the normalization coefficient $N_B$ for tracer B, equals the concentration $C_A$ of the reference tracer A at that point.

$$(C_C)(N_C) = C_A$$

The concentration $C_C$ of tracer C at a particular point during production, times the normalization coefficient $N_C$ for tracer C, equals the concentration $C_A$ of the reference tracer A at that point.

Once the normalization coefficients $N_B$, $N_C$ are known, they can be applied to the problem of determining allocation of produced fluid flow to each of the zones 14a,b,c. As depicted in FIG. 1B, one of the tracers A, B, C has been injected into each of the zones 14a,b,c, and then formation fluids 30 are produced from the zones with the tracers A, B, C therein.

Thus, a commingling of the formation fluids 30 and the tracers A, B, C from all of the zones 14a,b,c is produced from the well. These commingled fluids can be analyzed (for example, using gas/liquid chromatography-mass spectrometry) to determine the concentration $C_A$, $C_B$, $C_C$ of each tracer A, B, C in the produced fluids. The concentrations of the tracers B, C other than the reference tracer A are multiplied by their respective normalization coefficients $N_B$, $N_C$ determined previously to produce a normalized concentration $C_{BN}$, $C_{CN}$ for each of these tracers B, C. Thus: $C_{BN} = (C_B)(N_B)$ and $C_{CN} = (C_C)(N_C)$.

The relative concentrations of the reference tracer A and each of the other tracers B, C (as normalized) provides the relative proportions of produced fluid flow from the respective zones. Thus, the flow rate or produced volume over time from zone 14a is equal to the total production flow rate or produced volume, times $(C_A)/(C_A+C_{BN}+C_{CN})$; the flow rate or produced volume over time from zone 14b is equal to the total production flow rate or produced volume, times $(C_{BN})/(C_A+C_{BN}+C_{CN})$; and the flow rate or produced volume over time from zone 14c is equal to the total production flow rate or produced volume, times $(C_{CN})/(C_A+C_{BN}+C_{CN})$.

Note that, although in the above example, the tracer A was selected to be the reference tracer, any of the other tracers could have been selected to be the reference tracer. In addition, any number of tracers may be injected into any zone, but it is preferable for flow allocation purposes that at least one unique tracer be used in each zone.

Referring additionally now to FIGS. 2A-D, another example of the system 10 and method is representatively illustrated. In this example, two proximal wellbores 12a,b have been completed in a same field, but without substantial fluid communication between the wellbores. The wellbores 12a,b may be portions of the same well, or different wells.

Figure 2A:
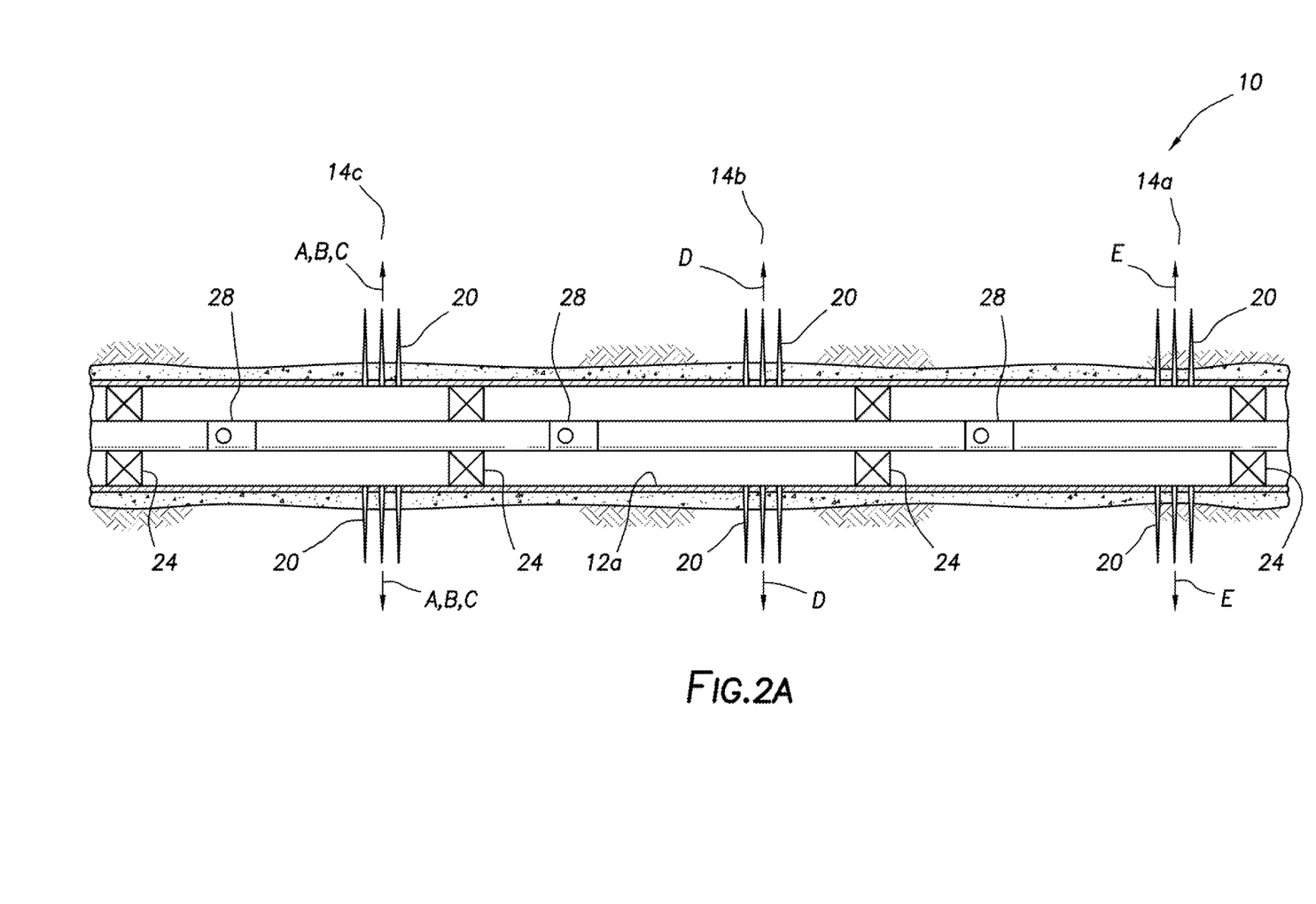
FIGS. 2A-C are representative partially cross-sectional views of another example of the well system and associated method, in which two wellbores are utilized.
Figure 2B:
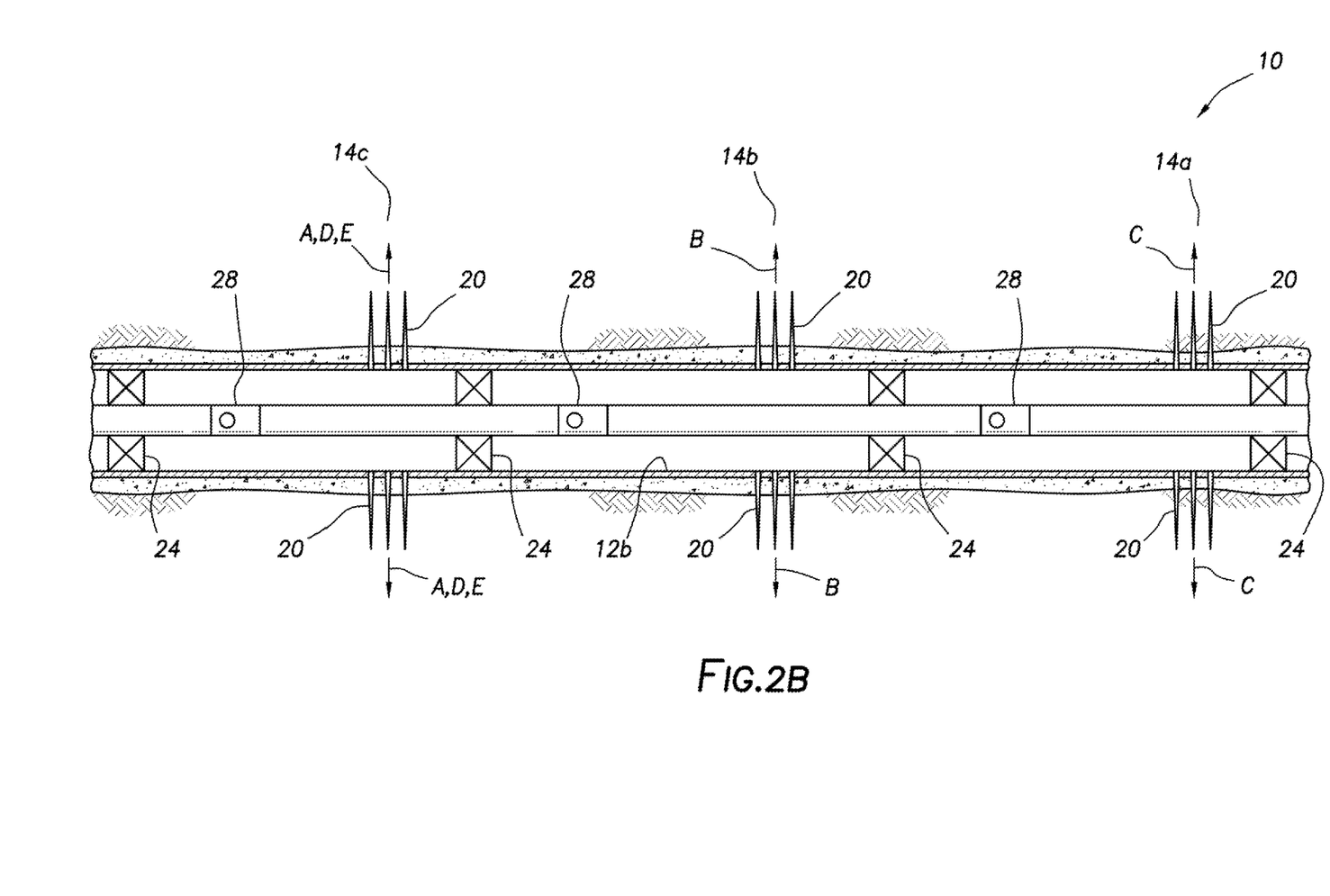

As depicted in FIGS. 2A & B, each of the wellbores 12a,b has a three zone completion. Although each of the wellbores 12a,b is illustrated as penetrating the same zones 14a,b,c, the wellbores could in other examples penetrate different zones. Preferably, however, all of the zones in which the steps of the method are performed are proximal zones.

In the first wellbore 12a, a reference zone (in this example, zone 14c) is injected with multiple tracers A, B, C (see FIG. 2A), including a reference tracer (in this example, tracer A). The remaining zones 14a,b are injected with at least one unique tracer E, D per zone. Although in FIG. 2A, the tracers A, B, C, D, E, are depicted as simultaneously flowing in the zones 14a,b,c, in this example the zones are actually separately injected, with the valves 28 being used to control the injection flow into each zone.

In the second wellbore 12b, a reference zone (in this example, again zone 14c) is injected with multiple tracers A, D, E (see FIG. 2B), including the reference tracer A. The remaining zones 14a,b are injected with at least one unique tracer B, C per zone. The zones 14a,b,c are separately injected, with the valves 28 being used to control the injection flow into each zone.

Note that the same reference tracer A is injected into a zone from each wellbore 12a,b. In addition, the reference tracer A is injected along with the tracers injected separately into the non-reference zones from the other wellbore. Thus, the reference tracer A is injected into the reference zone 14c from the wellbore 12a along with the tracers B, C, and the reference tracer is injected into the reference zone 14c from the wellbore 12b along with the tracers D, E.

Assuming the rock and fluid have the same or substantially similar physical and chemical properties between the two sets of zones 14a,b,c produced via the wellbores 12a,b, the normalization factors or coefficients ($N_B$, $N_C$, $N_D$, $N_E$) for all of the tracers B, C, D, E can be accurately determined. That is, the response of the other tracers B, C, D, E can be readily normalized to the reference tracer A response.

Figure 2C:
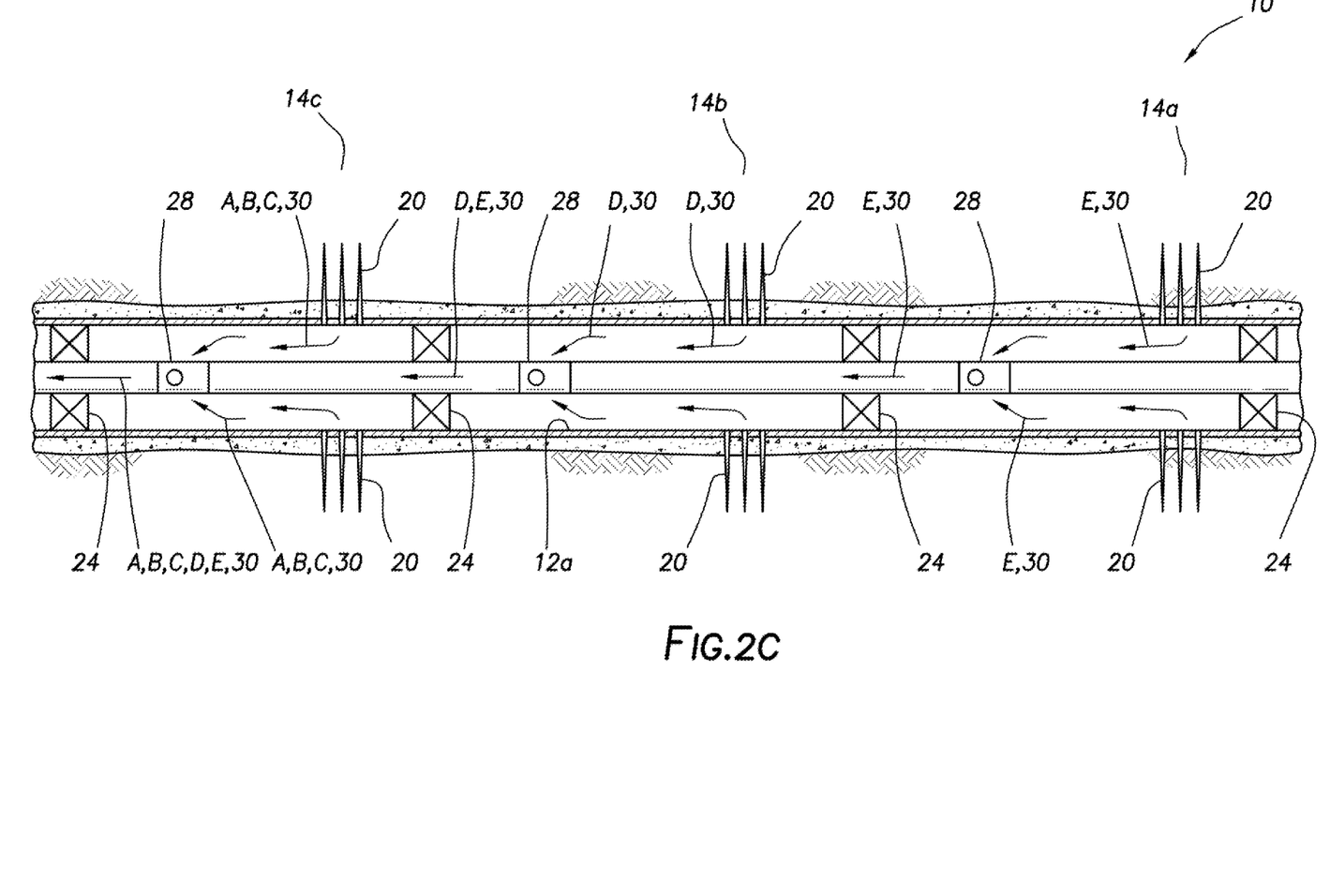
Figure 2D:
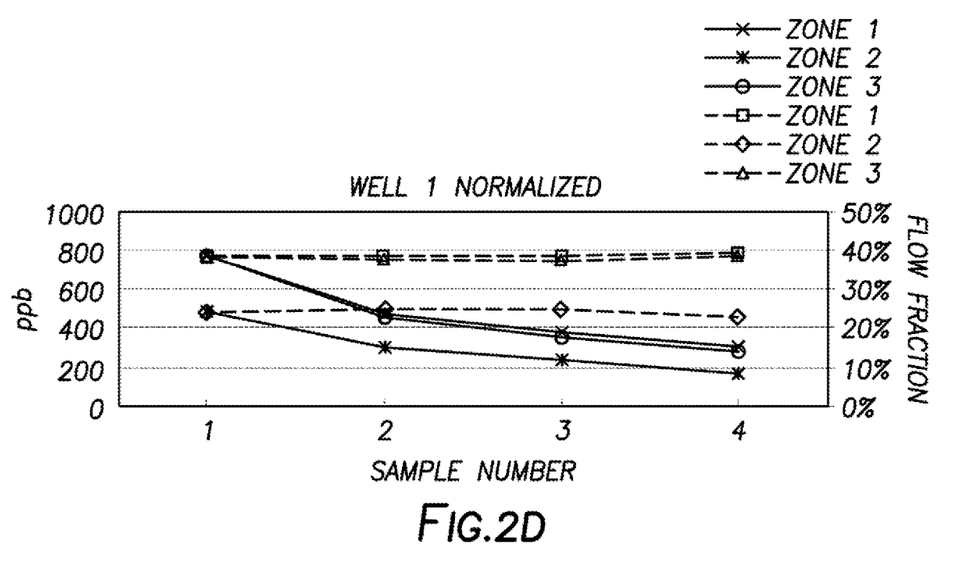
FIGS. 2D-G are representative graphs of normalized and uncorrected chemical tracer concentrations in parts per billion for fluids produced from the two wellbores.
Figure 2E:
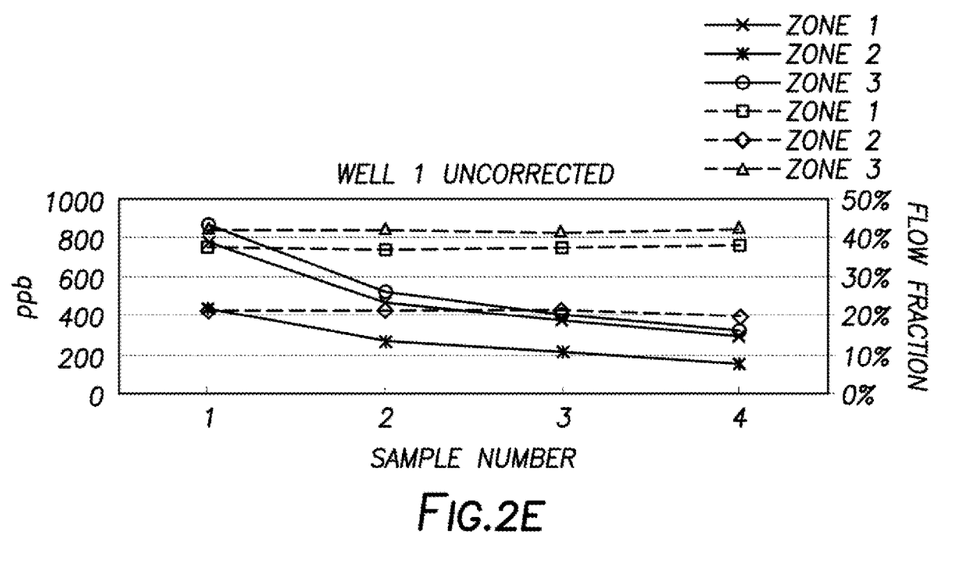
Figure 2F:
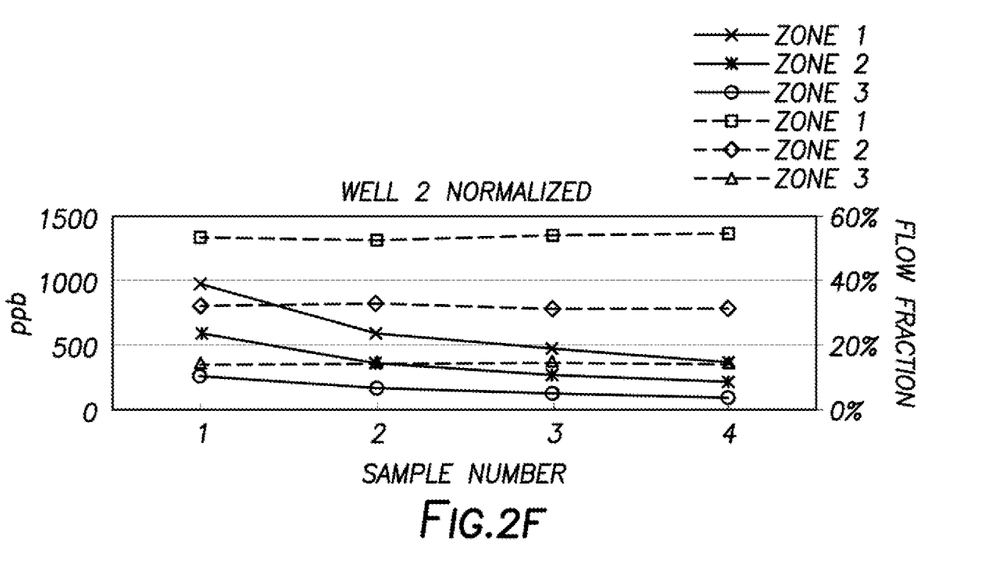
Figure 2G:
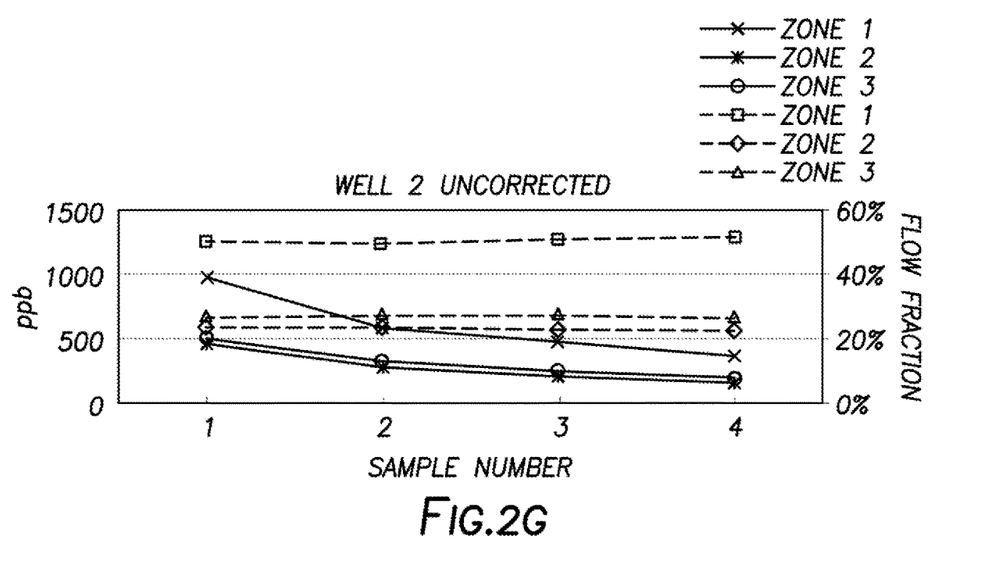

Referring additionally now to FIG. 2C, production flow from the wellbore 12a is representatively illustrated. Note that the commingled produced flow includes all of the tracers A, B, C, D, E and the formation fluids 30.

The relative concentrations of the reference tracer A and each of the other tracers D, E (as normalized) injected into the corresponding zones 14c,b,a provides the relative proportions of produced fluid flow from the respective zones. Thus, the flow rate or produced volume over time from zone 14a is equal to the total production flow rate or produced volume, times $(C_{EN})/(C_A+C_{DN}+C_{EN})$; the flow rate or produced volume over time from zone 14b is equal to the total production flow rate or produced volume, times $(C_{DN})/(C_A+C_{DN}+C_{EN})$; and the flow rate or produced volume over time from zone 14c is equal to the total production flow rate or produced volume, times $(C_A)/(C_A+C_{DN}+C_{EN})$.

A similar allocation can be performed for production from the wellbore 12b. In this example, the commingled produced flow again includes all of the tracers A, B, C, D, E and the formation fluids 30.

The relative concentrations of the reference tracer A and each of the other tracers B, C (as normalized) provides the relative proportions of produced fluid flow from the respective zones. Thus, the flow rate or produced volume over time from zone 14a is equal to the total production flow rate or produced volume, times $(C_{CN})/(C_A+C_{BN}+C_{CN})$; the flow rate or produced volume over time from zone 14b is equal to the total production flow rate or produced volume, times $(C_{BN})/(C_A+C_{BN}+C_{CN})$; and the flow rate or produced volume over time from zone 14c is equal to the total production flow rate or produced volume, times $(C_A)/(C_A+C_{BN}+C_{CN})$.

An operational example is provided in Table 1 below:

TABLE 1

Suppose two 3-zone wells have tracers at uniform concentrations injected as shown

|  | Well 1 | Well 2 |
|---|---|---|
| Zone 1 | A, B, C | A, D, E |
| Zone 2 | D | B |
| Zone 3 | E | C |

Now suppose samples were collected from the wells and the concentrations (in ppb) listed in Table 2 below were measured.

TABLE 2

|  |  | Sample 1 | Sample 2 | Sample 3 | Sample 4 |
|---|---|---|---|---|---|
| Well 1 | Tracer A | 777 | 462 | 367 | 291 |
|  | Tracer B | 598 | 367 | 289 | 216 |
|  | Tracer C | 1554 | 946 | 727 | 574 |
|  | Tracer D | 432 | 269 | 210 | 151 |
|  | Tracer E | 863 | 526 | 404 | 324 |
| Well 2 | Tracer A | 971 | 587 | 468 | 361 |
|  | Tracer B | 457 | 285 | 209 | 160 |
|  | Tracer C | 518 | 321 | 251 | 187 |
|  | Tracer D | 863 | 525 | 402 | 324 |
|  | Tracer E | 1110 | 663 | 515 | 410 |

In Well 1, since tracers A, B and C were injected into the same zone at the same concentration, ideally they would have shown up in the samples at the same concentration. But they didn't. A correction is needed. The normalization factors for tracers B and C can be determined with respect to A from this well by using linear regression with zero intercept. With these tracers, solving for the single regressor $$\hat{\beta} = \frac{\sum_{i=1}^{n} x_i y_i}{\sum_{i=1}^{n} x_i^2}$$

will give the scaling factor. In Excel™, for instance, the LINEST function will give the estimator. Another convenient way in Excel™ is the formula: =SUMPRODUCT(x-range,y-range)/SUMPRODUCT(x-range, x-range). Results for this example are listed in Table 3 below:

TABLE 3

|  |  | Sample 1 | Sample 2 | Sample 3 | Sample 4 | Norm Factor |
|---|---|---|---|---|---|---|
| Well 1 | Tracer A | 777 | 462 | 367 | 291 |  |
|  | Tracer B | 598 | 367 | 289 | 216 | 1.29 |
|  | Tracer C | 1554 | 346 | 727 | 574 | 0.50 |

Similarly, in Well 2, since A, D and E were injected into the same zone at the same concentration, ideally they would have shown up in the Well 2 samples at the same concentration. But the tracers are non-ideal, and so a correction is needed. The normalization factors for tracers D and E can be determined with respect to A from this well by using linear regression with zero intercept.

TABLE 4

|  |  | Sample 1 | Sample 2 | Sample 3 | Sample 4 | Norm Factor |
|---|---|---|---|---|---|---|
| Well 2 | Tracer A | 971 | 587 | 468 | 361 |  |
|  | Tracer D | 863 | 525 | 402 | 324 | 1.13 |
|  | Tracer E | 1110 | 663 | 515 | 410 | 0.88 |

Now, the responses can be corrected by the normalization factor. Well to well correction is possible, but generally not necessary. The normalized responses and resulting flow allocations are as listed in Table 5 below for this example:

TABLE 5

|  |  |  |  | Corrected Response |  |  |  | Corrected Flow Allocation |  |  |  |
|---|---|---|---|---|---|---|---|---|---|---|---|
|  |  |  | Norm Factor | Sample 1 | Sample 2 | Sample 3 | Sample 4 | Sample 1 | Sample 2 | Sample 3 | Sample 4 |
| Well 1 | Zone 1 | Tracer A |  | 777 | 462 | 367 | 291 | 38% | 38% | 38% | 39% |
|  | Zone 2 | Tracer D | 1.13 | 487 | 303 | 237 | 170 | 24% | 25% | 25% | 23% |
|  | Zone 3 | Tracer E | 0.88 | 761 | 464 | 356 | 286 | 38% | 38% | 37% | 38% |
| Well 2 | Zone 1 | Tracer A |  | 971 | 587 | 468 | 361 | 53% | 53% | 54% | 55% |
|  | Zone 2 | Tracer B | 1.29 | 590 | 368 | 270 | 206 | 32% | 33% | 31% | 31% |
|  | Zone 3 | Tracer C | 0.50 | 258 | 160 | 125 | 93 | 14% | 14% | 15% | 14% |

For comparison, the uncorrected values are as listed in Table 6 below:

TABLE 6

|  |  |  | Uncorrected Response |  |  |  | Uncorrected Flow Allocation |  |  |  |
|---|---|---|---|---|---|---|---|---|---|---|
|  |  |  | Sample 1 | Sample 2 | Sample 3 | Sample 4 | Sample 1 | Sample 2 | Sample 3 | Sample 4 |
| Well 1 | Zone 1 | Tracer A | 777 | 462 | 367 | 291 | 38% | 37% | 37% | 38% |
|  | Zone 2 | Tracer D | 432 | 269 | 210 | 151 | 21% | 21% | 21% | 20% |
|  | Zone 3 | Tracer E | 863 | 526 | 404 | 324 | 42% | 42% | 41% | 42% |
| Well 2 | Zone 1 | Tracer A | 971 | 587 | 468 | 361 | 50% | 49% | 50% | 51% |
|  | Zone 2 | Tracer B | 457 | 285 | 209 | 160 | 23% | 24% | 23% | 23% |
|  | Zone 3 | Tracer C | 518 | 321 | 251 | 187 | 27% | 27% | 27% | 26% |

FIGS. 2D-G depict representative graphs of the normalized and uncorrected responses and flow allocations or flow fractions (in dashed lines) for the two wells.

In the above example, there is one reference zone 14c per well (a zone in which the reference tracer A is injected). In other examples, determination of normalization coefficients can be distributed across a number of zones or wells. For instance, two wells, each with three zones, could be injected as listed in Table 7 below:

TABLE 7

|  | Well 1 | Well 2 |
|---|---|---|
| Zone 1 | Tracer A & B | Tracer A |
| Zone 2 | Tracer C & D | Tracer B & C |
| Zone 3 | Tracer E | Tracer D & E |

By using algebraic substitutions, all normalization coefficients can be determined (since there are six zones and only five tracers, with each tracer being injected into a proximal zone in each of the wells). It will also be appreciated by those skilled in the art that this technique can be permuted across a large number of tracers, zones and wells to determine the appropriate normalization coefficients, and then to determine flow allocation from each zone.

In another example, it may be desired to determine normalization coefficients for a limited number of zones. For example, it may be useful to evaluate flow allocation for just a toe section of each of two lateral wellbores. Conceptually, the toe zones of the two wellbores can be considered as if they are two proximal zones of a well.

A zone can comprise one or more stages. In the injection schedule listed in Table 8 below, Zone 1 might be 30 or more stages:

TABLE 8

|  | Well 1 | Well 2 |
|---|---|---|
| Zone 1 | Tracer A | Tracer B |
| Zone 2 (toe) | Tracer A, B & C | Tracer A, B & C |

The B:C normalization coefficient can be determined from Well 1 as described above and applied to the concentrations of C and B in Well 2:

[Well 1] $N_B/N_C=N_{B:C}$ [Well 2] $C_{CN}=(N_{B:C})(C_B)$

[Well 2] $C_{CN}/(C_B+C_{CN})$=Flow allocation for Zone 2

Likewise, the A:C normalization coefficient in Well 2 can be used to normalize the response from Well 1:

[Well 2] $N_A N_C=N_{A:C}$ [Well 1] $C_{CN}=(N_{A:C})(C_A)$

[Well 1] $C_{CN}/(C_A+C_{CN})$=Flow allocation for Zone 2

Thus, the contribution of Zone 2, with respect to the whole well can easily be determined using the (normalized) concentration ratios.

The tracer (solute) concentration is measured with respect to the solvent (e.g., oil or water). Since all tracers are in the same solvent, the ratio of the normalized concentration of the toe tracer C to the concentration of a whole well tracer (a tracer injected into all producing zones of interest in a well—A in Well 1, and B in Well 2) directly measures the contribution from the toe regardless of the amount of solvent. This reduces uncertainties introduced by typical laboratory processes, such as esterification or solid phase extraction.

One advantage of this technique is that relatively low-cost tracers can be used for the whole well tracers A, B in the respective Wells 1, 2. Since the whole well tracer is not diluted by other stages, it can be injected at a much lower concentration (provided ratiometric compensation on the measured concentrations are made). It will be appreciated by those skilled in the art that this technique could be used for one or any other number of zones per well.

Figure 3:
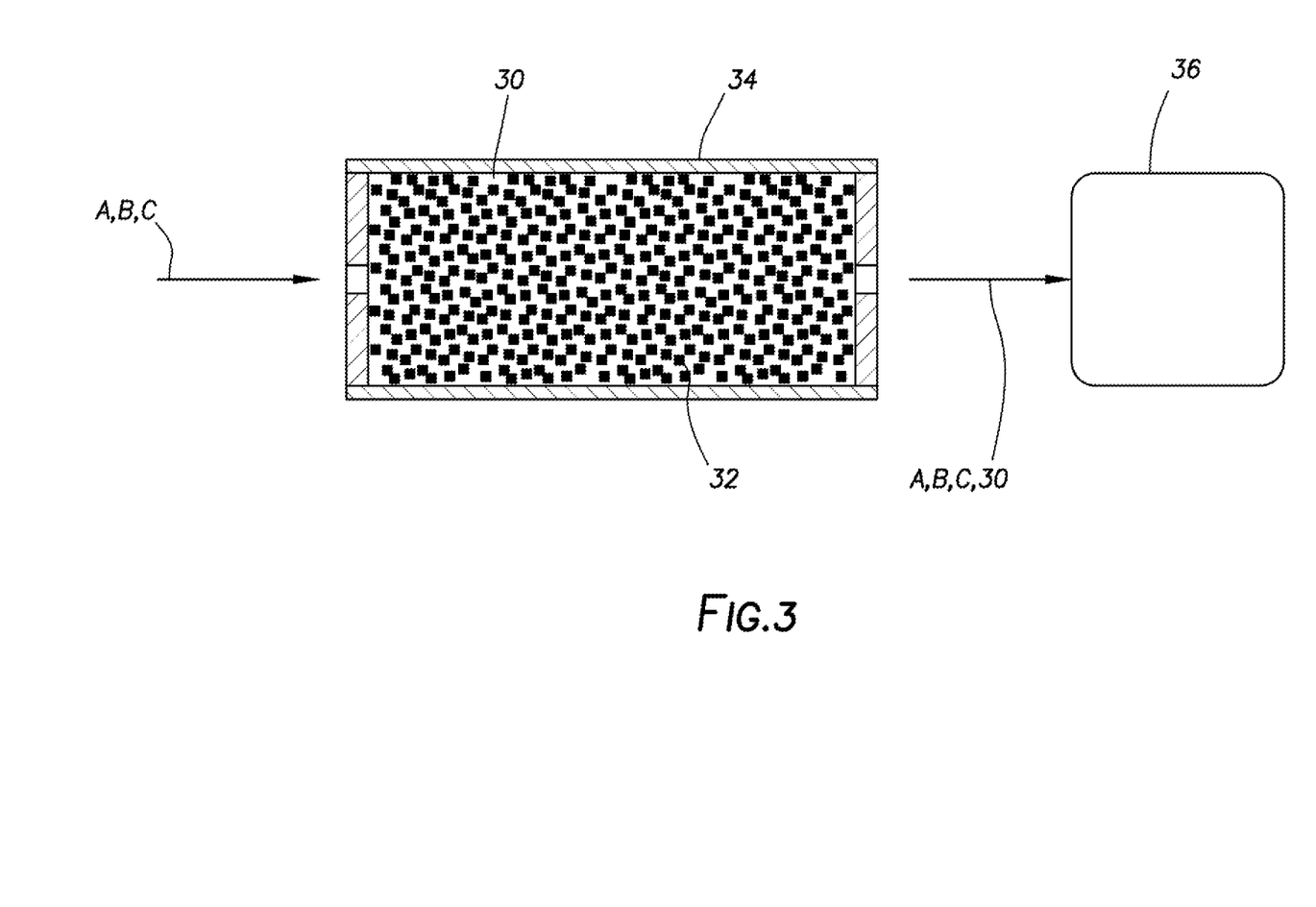
FIG. 3 is a representative cross-sectional view of a laboratory measurement method for determining chemical tracer normalization coefficients.

Referring additionally now to FIG. 3, another example of the method is representatively illustrated. In this example, the normalization coefficients can be determined though laboratory measurement.

One example of laboratory measurement depicted in FIG. 3 comprises flowing chemical tracers A, B, C through drilling cuttings 32. The drilling cuttings 32 are packed in a cylinder 34 or other pressure-bearing container at formation temperature and pressure.

Pore spaces in the cuttings 32 are filled with formation fluids 30. The chemical tracers A, B, C are injected from an inlet on one side, and are collected from an outlet on the other side. Their concentrations as observed at the outlet (for example, using a spectrometer 36) can be used to evaluate the normalization coefficients. Other laboratory tests with different test settings may also achieve the same objective.

In any of the above described examples, the normalization coefficients can be applied to measured chemical tracer concentrations when the relative relationships between tracer flowback concentrations or profiles is needed for further interpretation. One such interpretation technique is that of allocating stage inflow contribution in a multistage hydraulically fractured lateral. The following steps may be performed in one example of this technique:

1. Determine the normalization coefficients for a set of chemical tracers.
2. Pump the same set of tracers into the target multistage horizontal well in the proximal zones. Each stage is injected with one or more unique chemical tracer(s).
3. Collect flowback samples and analyze tracer concentration. Tracers should be injected at the same concentration. If injection concentration is not the same, each tracer flowback concentration should be multiplied by a ratio of a reference tracer injection concentration to the actual injection concentration of the tracer.
4. Apply the corresponding normalization coefficient to each chemical tracer flowback profile. That is, the tracer concentration in each sample should be multiplied by the corresponding normalization coefficient for the tracer. The concentration of the reference tracer is not multiplied by a normalization coefficient (or the normalization coefficient for the reference tracer could be considered to be one).
5. Compare the normalized tracer flowback profiles and the reference tracer flowback profile, to determine the respective stage inflow contributions. Non-ideal chemical tracers only indicate the contribution or allocation with respect to the corresponding carrier fluid (e.g., water, oil or gas).

Chemical tracers suitable for use in the systems and method examples described herein are typically chemical compounds that are soluble in a specific carrier fluid, with low partitioning coefficient in other phases. For example, oil soluble tracer can be used where oil is the primary production fluid. Typical oil soluble tracers include, but are not limited to, fluorobenzenes, chlorobenzenes, and bromobenzenes. Water soluble tracers can be used in situations in which water is the primary production fluid. Typical water soluble tracers include, but are not limited to, sulfonic acids, fluorobenzoic acids, and chlorobenzoic acids. Gas soluble tracers can be used in situations where gas is the primary production fluid. Typical gas soluble tracers include, but are not limited to, mercaptan, nitrogen, perfluoromethylcyclopentanes and perfluoromethylcyclohexanes.

It may now be fully appreciated that the above disclosure provides significant advancements to the arts of evaluating chemical tracer response in zones of subterranean wells and allocating flow to the individual zones.

In one example, the above disclosure provides to the arts a method for normalizing a first chemical tracer response in a first zone of a subterranean well. The method can comprise: measuring a concentration of the first chemical tracer as produced from a second zone, the second zone being proximal to the first zone; measuring a concentration of a reference second chemical tracer as produced from the second zone; and applying a mathematical correction to a concentration of the first chemical tracer as produced from the first zone.

Formation fluids from the first and second zones may be produced by the same subterranean well. Formation fluids from the second zone may be produced by a well adjacent to the subterranean well.

The second zone may be in a same field as the first zone. The second zone may be in a same earth formation as the first zone.

At least one of the first and second tracers may be a non-ideal tracer.

The mathematical correction preferably produces the response of the first chemical tracer in the first zone normalized to the reference second chemical tracer response.

The method may include determining flow allocation between at least the first and second zones utilizing the normalized first chemical tracer response and the reference second chemical tracer response.

Also provided by the above disclosure is a method for allocating flow to each of multiple zones of first and second subterranean wellbores. In one example, the method can comprise: injecting a reference tracer and a first set of tracers into a first reference zone from the first wellbore; injecting a second set of tracers into respective zones from the first wellbore, each of the second set of tracers being injected into a respective one of the first wellbore zones; measuring concentrations of the reference tracer and the first and second sets of tracers in formation fluids produced from the first wellbore; injecting the reference tracer and the second set of tracers into a second reference zone from the second wellbore; injecting the first set of tracers into respective zones from the second wellbore, each of the first set of tracers being injected into a respective one of the second wellbore zones; and measuring concentrations of the reference tracer and the first and second sets of tracers in formation fluids produced from the second wellbore.

A normalization coefficient may be determined for each of the first and second sets of tracers, each of the normalization coefficients normalizing the measured concentrations of the tracers produced from the first and second reference zones to the measured concentrations of the reference tracer produced from the first and second reference zones.

Each normalization coefficient may be determined by linear regression with a zero y-intercept.

The measured reference tracer concentrations may be compared to the normalized concentrations of the first and second sets of tracers, in order to determine allocation of flow from each of the first and second reference zones and the zones into which the first and second sets of tracers were injected from the first and second wellbores.

The first and second wellbore zones, including the first and second reference zones, are preferably proximal zones. The first and second wellbores may be portions of respective first and second proximal wells.

The reference and first and second sets of tracers may be injected at a same concentration.

Another method described above can comprise: normalizing a concentration of a chemical tracer to a reference tracer concentration; and then allocating flow to a zone corresponding to the chemical tracer, the allocating being based at least in part on the normalized chemical tracer concentration.

The chemical tracer concentration may be normalized based on measuring the reference tracer and chemical tracer concentrations as produced from a same reference zone, or as flowed through a same container of drill cuttings.

Another method described above can comprise: injecting a first one of multiple chemical tracers into a reference zone of a first wellbore; injecting the first chemical tracer into additional producing zones of the first wellbore; injecting a second one of the chemical tracers into a reference zone of a second wellbore; injecting the second chemical tracer into additional producing zones of the second wellbore; and injecting a third one of the chemical tracers into each of the additional producing zones of the first and second wellbores.

The additional producing zones of the first and second wellbores are preferably proximal zones.

A ratio of normalization coefficients for flowback of the second and third tracers relative to the first tracer from the first wellbore ($N_B/N_C = N_{B:C}$) can be applied to a flowback concentration of the second tracer from the second wellbore to determine a concentration of the third tracer normalized to a flowback concentration of the second tracer from the second wellbore ($C_{CN} = (N_{B:C})(C_B)$).

A ratio of normalization coefficients for flowback of the first and third tracers relative to the second tracer from the second wellbore ($N_A/N_C = N_{A:C}$) can be applied to a flowback concentration of the first tracer from the first wellbore to determine a concentration of the third tracer normalized to a flowback concentration of the first tracer from the first wellbore ($C_{CN} = (N_{A:C})(C_A)$).

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in wellbores with various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. Accordingly, the foregoing detailed description is to be clearly understood as being given by way of illustration and example only, the spirit and scope of the invention being limited solely by the appended claims and their equivalents.

What is claimed is:

1. A method for normalizing a first chemical tracer response in a first zone of a subterranean well, the method comprising:
   injecting a first chemical tracer into the first zone:
   injecting a reference second chemical tracer into a second zone;
   measuring a concentration of the first chemical tracer as produced from a second zone, the second zone being proximal to the first zone;
   measuring a concentration of the reference second chemical tracer as produced from the second zone; and
   applying a mathematical correction comprising a normalization coefficient to a concentration of the first chemical tracer as produced from the first zone, in which the mathematical correction normalizes the concentration of the first chemical tracer in the first zone to the reference second chemical tracer concentration.

2. The method of claim 1, in which formation fluids from the first and second zones are produced by the same subterranean well.

3. The method of claim 1, in which formation fluids from the second zone are produced by a well adjacent to the subterranean well.

4. The method of claim 1, in which the second zone is in a same field as the first zone.

5. The method of claim 1, in which the second zone is in a same earth formation as the first zone.

6. The method of claim 1, in which at least one of the first and second tracers is soluble in a fluid other than its carrier fluid.

7. The method of claim 1, further comprising determining flow allocation between at least the first and second zones utilizing the normalized first chemical tracer response and the reference second chemical tracer response.

8. A method for allocating flow to each of multiple zones of first and second subterranean wellbores, the method comprising:
   injecting a reference tracer and a first set of tracers into a first reference zone from the first wellbore;
   injecting a second set of tracers into respective zones from the first wellbore, each of the second set of tracers being injected into a respective one of the first wellbore zones;
   measuring concentrations of the reference tracer and the first and second sets of tracers in formation fluids produced from the first wellbore;
   injecting the reference tracer and the second set of tracers into a second reference zone from the second wellbore;
   injecting the first set of tracers into respective zones from the second wellbore, each of the first set of tracers being injected into a respective one of the second wellbore zones; and
   measuring concentrations of the reference tracer and the first and second sets of tracers in formation fluids produced from the second wellbore
   determining a normalization coefficient for each of the first and second tracers, each of the normalization coefficients normalizing the measured concentrations of the tracers produced from the first and second reference zones to the measured concentrations of the reference tracer produced from the first and second reference zones.

9. The method of claim 8, in which each normalization coefficient is determined by linear regression with a zero y-intercept.

10. The method of claim 8, in which the measured reference tracer concentrations are compared to the normalized concentrations of the first and second sets of tracers, in order to determine allocation of flow from each of the first and second reference zones and the zones into which the first and second sets of tracers were injected from the first and second wellbores.

11. The method of claim 8, in which the first and second wellbore zones, including the first and second reference zones, are proximal zones.

12. The method of claim 8, in which the first and second wellbores are portions of respective first and second proximal wells.

13. The method of claim 8, in which the reference and first and second sets of tracers are injected at a same concentration.

14. A method, comprising:
   injecting a chemical tracer in a zone in a subterranean well;
   injecting a reference tracer in the zone in the subterranean well;
   measuring the concentrations of the chemical tracer and the reference tracer;
   determining a normalization coefficient for the chemical tracer, the normalization coefficient normalizing a concentration of the chemical tracer to the reference tracer concentration; and
   then allocating flow to the zone corresponding to the chemical tracer, the allocating being based at least in part on the normalized chemical tracer concentration.

15. The method of claim 14, in which the chemical tracer concentration is normalized based on measuring the reference tracer and chemical tracer concentrations as produced from a same reference zone.

16. The method of claim 14, in which the chemical tracer concentration is normalized based on measuring the reference tracer and chemical tracer concentrations as flowed through a same container of drill cuttings.

17. A method, comprising:
   injecting a first one of multiple chemical tracers into a reference zone of a first wellbore;
   injecting the first chemical tracer into additional producing zones of the first wellbore;
   injecting a second one of the chemical tracers into a reference zone of a second wellbore;
   injecting the second chemical tracer into additional producing zones of the second wellbore; and
   injecting a third one of the chemical tracers into each of the additional producing zones of the first and second wellbores;
   determining a normalization coefficient for each of the tracers, each of the normalization coefficients normalizing the measured concentrations of the tracers produced from the first and second wellbores to the measured concentrations of a tracer produced from the first and second wellbores.

18. The method of claim 17, in which the additional producing zones of the first and second wellbores are proximal zones.

19. The method of claim 17, in which a ratio of normalization coefficients for flowback of the second and third tracers relative to the first tracer from the first wellbore ($N_B/N_C = N_{B:C}$) is applied to a flowback concentration of the second tracer from the second wellbore to determine a concentration of the third tracer normalized to a flowback concentration of the second tracer from the second wellbore ($C_{CN} = (N_{B:C})(C_B)$).

20. The method of claim 17, in which a ratio of normalization coefficients for flowback of the first and third tracers relative to the second tracer from the second wellbore ($N_A/N_C = N_{A:C}$) is applied to a flowback concentration of the first tracer from the first wellbore to determine a concentration of the third tracer normalized to a flowback concentration of the first tracer from the first wellbore ($C_{CN} = (N_{A:C})(C_A)$).

* * * * *

UNITED STATES PATENT AND TRADEMARK OFFICE
CERTIFICATE OF CORRECTION

PATENT NO. : 11,384,636 B2  
APPLICATION NO. : 16/653277  
DATED : July 12, 2022  
INVENTOR(S) : Mitchell C. Smithson et al.

Page 1 of 1

It is certified that error appears in the above-identified patent and that said Letters Patent is hereby corrected as shown below:

In the Claims

Claim 1, Column 12, Line 48, cancel the word "a" and insert in place thereof --the--.

Signed and Sealed this
Thirteenth Day of September, 2022

Katherine Kelly Vidal
*Director of the United States Patent and Trademark Office*